United States Patent [19]

Jones-Hinton

[11] 4,151,029

[45] Apr. 24, 1979

[54] METHOD OF MAKING TENNIS BALLS

[75] Inventor: James Jones-Hinton, Solihull, England

[73] Assignee: Dunlop Limited, London, England

[21] Appl. No.: 676,484

[22] Filed: Apr. 13, 1976

[30] Foreign Application Priority Data

Apr. 30, 1975 [GB] United Kingdom ............ 17942/75

[51] Int. Cl.² ............................................. A63B 39/06
[52] U.S. Cl. .................................... 156/145; 156/285;
273/58 R; 273/58 BA; 273/58 J; 273/61 R;
273/61 B; 273/61 C
[58] Field of Search ............... 156/145, 146, 147, 156,
156/245, 285, 382; 264/90, 236, 241, 248, 249,
257, 262, 267; 273/58 R, 58 BA, 58 J, 61 R, 61
B, 61 C, 65 ED

[56] References Cited

U.S. PATENT DOCUMENTS

| | | | |
|---|---|---|---|
| 1,509,025 | 9/1924 | Patterson | 273/61 R |
| 1,640,987 | 8/1927 | Gray | 273/58 R |
| 1,853,515 | 4/1932 | Egerer | 273/58 R |
| 2,018,559 | 10/1935 | Horner | 273/61 R |
| 3,039,773 | 6/1962 | Teeguarden et al. | 273/61 R |
| 3,390,482 | 7/1968 | Holtuoigt | 156/285 |

FOREIGN PATENT DOCUMENTS 833907 7/1952 Fed. Rep. of Germany ........ 273/58 R
11446 5/1902 United Kingdom.

*Primary Examiner*—Caleb Weston
*Attorney, Agent, or Firm*—Stevens, Davis, Miller & Mosher

[57] ABSTRACT

A method of making hollow playballs, particularly tennis balls, having a fiberous e.g. fabric layer, and a flexible polymeric layer in the wall of the ball. The method involves forming laminate blanks of the fiberous material and polymer, edge-joining one or more blanks to form a closed hollow body and hot molding the hollow body in a mold of the desired configuration. A novel playball is also provided.

18 Claims, 5 Drawing Figures

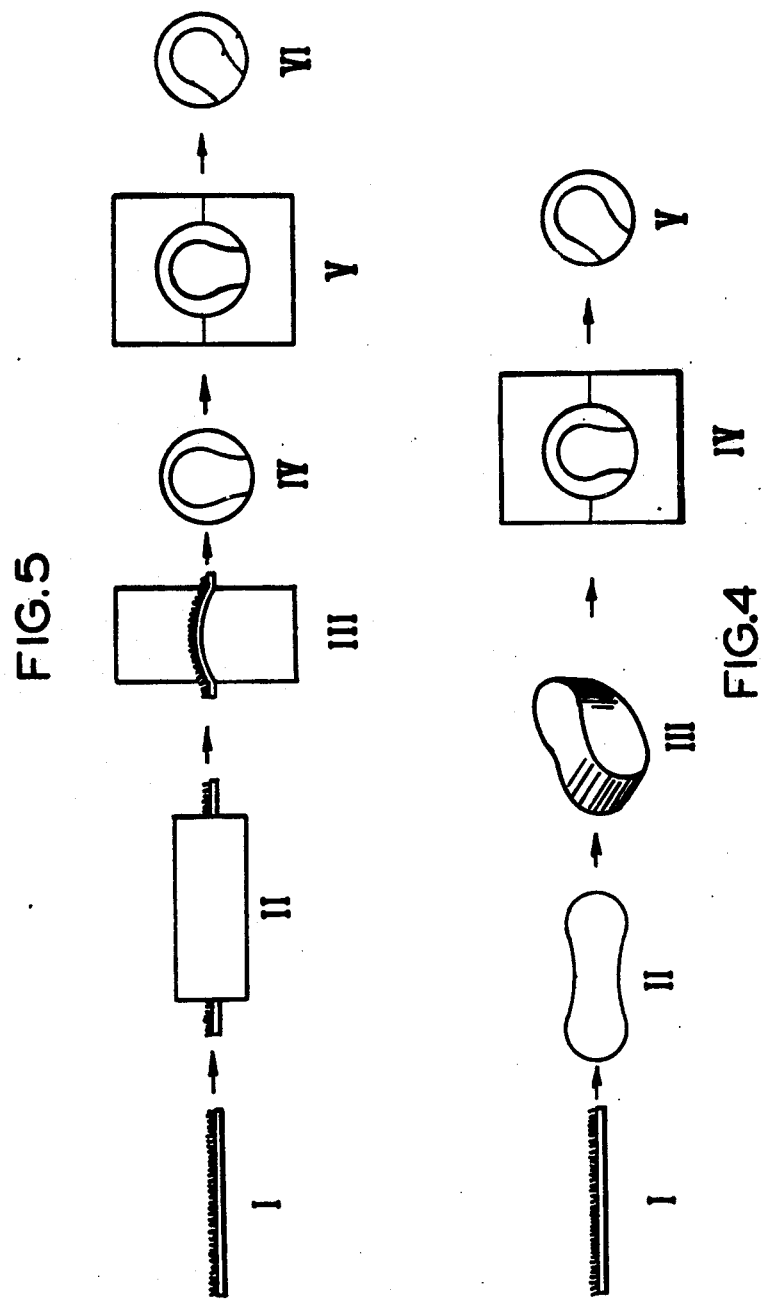

METHOD OF MAKING TENNIS BALLS

This invention relates to playballs and particularly to a method of making a hollow playball whose wall comprises a layer of polymeric material and a layer of fiberous, e.g. fabric, material. It is especially concerned with playballs having a hollow core of an elastomeric material and a covering layer of fabric material over that core.

The invention has particular applicability to tennis balls and hence will be described below with particular reference to tennis balls.

The manufacture of a tennis ball is conventionally very laborious in that its elastomeric core is made separately and its covering layer is then applied to the finished core. The core is usually of vulcanized rubber and is made, for example, by molding a pair of hemispherical rubber cups which are then adhered together. The fabric cover which is then applied over the core is formed by cutting a sheet of the fabric into, usually, "dumb-bell" shapes. The edges of the dumb-bells are coated with a suitable adhesive, usually a white rubber solution, i.e. edge-dipping, and the adhesive is allowed to dry. A pair of the dumb-bells is then fitted by hand to a rubber core previously coated with adhesive. The assembly so formed is consolidated and the rubber vulcanized by moulding in a suitable mold, the white edge-adhesive flowing to form the traditional seam line.

Thus the overall conventional process is lengthy and labor-intensive.

The present invention eliminates the need for the formation of a separate core and hence also eliminates the need to separately apply a cover to that core.

Accordingly, in one aspect the invention provides a method of making a hollow playball in which laminated blanks are made comprising a layer of fiberous material and a layer of flexible polymeric material, the edges of one or more blanks are adhered together to form a hollow closed body, the hollow body is placed in a mould whose interior surface has the configuration of the desired playball (normally but not necessarily, substantially spherical) and heat is applied to conform the hollow body to the interior surface of the mold.

The fiberous material is preferably a textile material, e.g. a woven or non-woven fabric, but it may be a layer of flocked fibers applied to the layer of polymeric material. Usually the fiberous layer will form the cover of the playball and hence the playball will be made with the fiberous layer on the outside.

Thus in another aspect the invention provides a hollow playball comprising an outer covering of fiberous material attached to a core of flexible polymeric material, the playball having a seam which defines a joint between edges of one or more blanks of a laminate of the fiberous material and the flexible polymeric material, whereby the joint runs through both the covering and the core.

In one embodiment the laminate is made in sheet form from a layer of fabric and a layer of the flexible polymeric material and blanks of suitable shape are cut from the laminate sheet. Alternatively, if desired, it is possible for each blank to be formed initially by laminating a layer of the polymeic material to a piece of fabric having the desired blank shape. The former method has advantages by way of convenience and economy of process steps. However, the latter method can be advantageous in that the separate formation of fabric blanks can reduce the amount of non-reuseable polymer scrap. (The scrap from the former method, being laminated fabric and polymer, may not be reusable).

The flexible polymeric material is preferably an initially unvulcanized elastomer but may be a thermoplastics material, e.g. an ethylene-vinyl acetae copolymer (E.V.A.). Where the playball is intended to be a tennis ball of good quality, e.g. suitable for use in official matches, it will be found necessary to ensure that the polymeric material used is elastomeric, e.g. natural rubber.

To make a tennis ball, the laminate blanks may conveniently be of dumb-bell shape so that two dumb-bells may be joined together around their edges to form the hollow body or 'ball blank.' Provided that the laminated elastomer is of the required color (e.g. white) and has adequate self-adhesive properties in the uncured state, i.e. has 'green-stick', edge-dipping may not be necessary, since during molding, the elastomer will flow between the fabric edges to form a seamline of traditional appearance.

It may be advantageous to use edge-dipping or edge-coating of the laminate blanks for some of the polymeric compositions that might be used as the flexible polymeric layer. For exaple, a white adhesive composition could be applied to the edges of the blanks to give a white seam in the finished playball without the need to have a white composition for the entire polymeric layer. The edge-dipping cmposition may also be compounded to be more tacky than the inherent-tack properties of the polymeric layer itself and hence the ball-blank forming properties of the laminate blanks may be improved by this means. Nevertheless it is preferred to dispense with an edge-dipping step wherever the properties of the flexible polymeric layer allow, since there are obvious process economies where such a step can be omitted.

It will be necessary, for a satisfactory, high quality tennis ball, to ensure that the initially unvulcanised elastomer is vulcanized at some stage in the manufacturing process. This may conveniently be done during the hot-molding in the spherical mold.

Where the laminate blanks are in the shape of dumb-bells they may be bent into subsantially 'U' shape prior to joining them together around their edges. It may be found advantageous in some instances to warm the laminate blanks, e.g. to 80° C. before edge-joining them into "ball blank" form. The warmed laminate blanks may be easier to form and, where their tack is being relied on for joining, that may be improved by warming. (Where a thermoplastics material is used, it may conveniently be rendered tacky around its edges, e.g. by application of heat or a suitable solvent.)

Thus a hollow body, or ball blank, is formed having the fabric layer on the outside. This can be placed in a suitably-sized spherical mold and hot-molded to form the desired spherical ball.

It is possible to form the playball from a single, suitably-shaped laminate blank if desired, or more than two blanks may be used. For example a substantially T-shaped or petal-shaped blank could be used as a single blank to form the desired hollow body. However, as indicated above, for tennis ball production it will normally be found convenient to use two substantially identical dumb-bell shaped laminate blanks.

Since the ball blank placed in the spherical mold may be far from spherical in shape and may in fact only initially contact the mold surface at a few points, it may be desirable to apply vacuum to the mold cavity during the molding step. This will help to draw the blank into contact with the mold surface over all of its area and may thereby improve the uniformity of heat transfer to the blank. The use of vacuum may also reduce molding time.

Where a vacuum is to be used at the ball-forming stage it is preferable to warm the ball blanks before the vacuum is applied. Otherwise the vacuum may tend to pull at the seams (join lines) between the laminate blanks forming the ball blank and cause faulty moldings. Pre-warming can ensure that the ball blanks form to the configuration of the mold under the influence of the vacuum without undue stress being placed on the seam lines. If a vacuum is not used at this stage, then pre-warming of the ball blanks may not be necessary since any increase in internal pressure will not normally be sufficient to start to form the blank against the mold until the blank has already softened sufficiently to undergo that forming without harm to its seams.

The ball so molded may then be subjected to any of the traditional finishing processes, e.g. steaming, to raise any woolen nap in the fabric, or the branding of trade marks.

A pre-forming operation may usefully be employed between the formation of the laminate and the construction of the ball blank. This can give greater scope for the disposition of the seam line in the finished ball. For example, the laminate blanks may be shaped to 3-dimensional form after being stamped from the laminated sheet material. Alternatively, the shaped blanks may be formed in the sheet and then stamped out. As an example of the preforming embodiment, the laminate blanks may be pre-formed into hemispheres. Pairs of hemispheres can then be joined around their open circumferences to form the ball blanks. The finished ball would then have a simple equatorial seam-line. Many other possible preformed blank shapes can be used including many variations of the basic dumb-bell shape formed into 3-dimensional form.

The choice of suitable fabrics for any particular purpose is a routine matter for the skilled man of the art. However, since the fabric may need to expand to a certain extent in the final molding stage, it will be appreciated that it must have sufficient stretch to achieve that expansion. Where the product is to be a tennis ball, the fabric used to form the laminate may be any material suitable for use as a tennis ball cover. It may, for example, be a traditional melton cloth or a needled cloth, e.g. of the type described in our German Patent Specification No. DT 2,449,669.

Similarly the elastomer used may be any suitable one, particularly conventionally-used rubbers for tennis balls, e.g. natural rubber. These may be compounded by conventional means to include fillers, e.g. clay, vulcanizing agents, e.g. sulphur; pigments; accelerating and processing aids. The elastomer composition may be formulated to be suitable for a pressureless tennis ball or for the pressured type, i.e. those having an internal pressure of, say 8 to 15 p.s.i. (0.56 to 1.05 Kg/m$^2$). This internal pressure is conveniently achieved by placing pellets of suitable chemical compositions in the ball blank before it is moulded, the heat of the molding causing chemical decomposition and gas formation. This is a conventional practice, the pellets usually being of ammonium chloride and sodium nitrite. A small amount of water is also required. In the process of this invention the pellets would of course be placed in position during formation of the hollow body of the ball blank. Alternatively the ball blanks may be formed in a pressured atmosphere to obtain any desired internal pressure. Where water is used, it may be advantageous to add the water after the formation of the ball blank. This could be done by injecting the water by a hyperdermic needle into the ball blank. If the water is added before the ball blank is formed into its enclosed hollow form, it is possible that some of the water may find its way into the seams of the blank. This could have a deleterious effect on the join between the blank parts. As an alternative to hyperdermic injection, the water could be placed in the ball blank in suitably encapsulated form, e.g. in thin plastic sachets, its release being secured by appropriate conditions, e.g. rise in temperature, when required. Separating the water from the other active ingredients also has the advantage of increasing the shelf-life of the ball blanks.

Rubber compositions suitable for pressureless tennis balls are well known. Examples of such compositions are described in our U.K. Patent Nos. 1,108,555, 1,108,556 and 1,108,557.

As the fabrics and elastomers used can conveniently be those used in conventional tennis ball manufacture, it will be appreciated that they may be used in conventional weights and thicknesses. However, where the ball blank is to expand in its mold, it may be advisable to form the laminate a little thicker than the required final thickness in the ball to allow for the thinning that that expansion will cause.

The laminate of fabric and polymer can be made by conventional techniques. Thus, for example, a sheet of calendered uncured elastomer can be formed and the fabric layer placed onto it, the two contiguous layers being passed through a nip to squeeze them together. They need only be sufficiently well joined together to withstand the handling of the further stages of the process and the mechanical lock achieved by the lamination may well be sufficient. However, if desired the fabric may be coated with a suitable adhesive prior to lamination.

The laminate may consist of more than two layers. For example, a triple laminate may be used consisting of an outer fabric layer, an intermediate uncured elastomer layer and a thin layer of, e.g. polymeric material impermeable to gases with which the ball may be pressurized. The polymer layer itself may consist of more than one layer e.g. a white layer (for the seam effect) may be laminated to a black foundation layer.

The laminate blanks may be cut from the laminate sheet by conventional means, e.g. stamping. These blanks may be bent manually into, say, a 'U'-shape and two such 'U'-shapes brought together and joined around their edges to form the hollow body which is the ball blank. Alternatively, mechanical means can be provided to bend the blanks into the desired shape.

The actual shape of the hollow body or ball blank that is formed from the laminate blanks is not of critical importance and any rough shape, which may for example be hand-formed, may be suitable. This is particularly so if uniformity of thickness of the polymeric layer in the finished product is not of great importance. However, for an article such as a top class tennis ball, uniformity of core thickness is important. Hence, for such an article the ball blank should not be too non-uniform or thickness variations noticeable in play with the product may result, owing to differential degrees of expansion in the final molding stage.

The invention provides a number of clear advantages over conventional methods of making tennis balls:
1. All separate core making operations are eliminated.
2. The use of adhesives on and buffing of the core are eliminated.
3. The need to adhesively edge-dip dumb-bell cover parts may be eliminated.
4. Labour-intensive cover-to-core fittings are eliminated.
5. A single hot-molding cycle can be used.
6. Direct control of product weight from a standardized laminate is possible.

The invention is illustrated by way of example only with reference to the accompanying drawings in which:

FIG. 4 shows a diagrammatic representation of steps in one method of carrying out the invention, and FIG. 5 shows a diagrammatic representation of steps of an alternative method of carrying out the invention.

Figure 1:
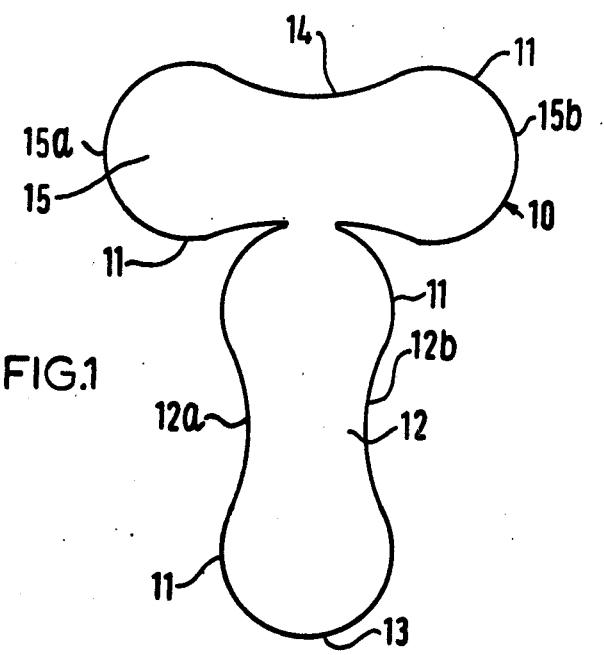
FIG. 1 is a plan view of a single laminate blank that can be used to form a hollow body or ball blank for use in the invention.
Figure 2:
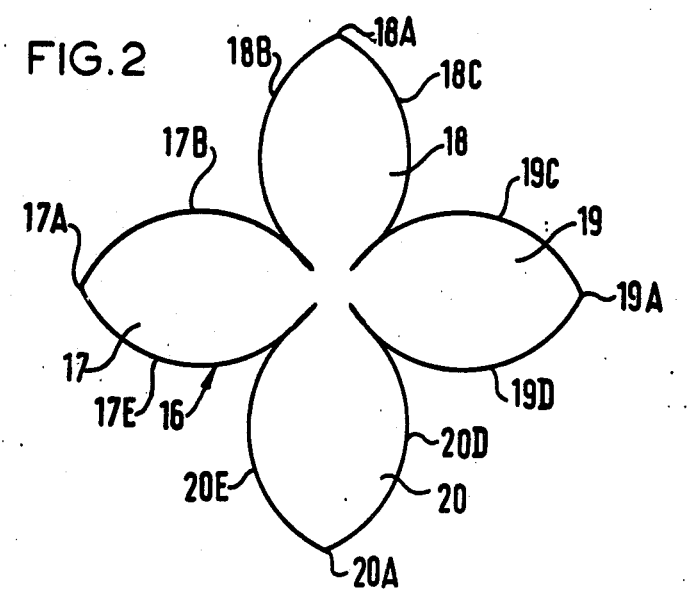
FIG. 2 is a plan view of an alternative shape of a single laminate blank.

FIGS. 1 and 2 both show in plan view laminate blanks that can be used to make a playball from a single blank. In FIG. 1 blank 10 is of substantially T-shaped outline. It can be joined to itself around its edge 11 to form an enclosed hollow body. This can be done by bending the upright portion 12 of the 'T' up and over until its rounded base portion 13 is brought into abutting contact with the correspondingly rounded portion of the cross-portion 15 of the 'T'. Curved edge portions 15a, 15b at opposite ends of portion 15 are brought into contact with the correspondingly curved edge portion 12a, 12b respectively of portion 12 and a complete edge-joining, e.g. by hand pressing, around the entire periphery can be achieved to produce a closed hollow body.

In FIG. 2 the laminate blank 16 consists of four substantially identical petals 17, 18, 19, 20. The petals can be bent by raising their tips, 17A, 18A, 19A, 20A and joining them together. During this operation petal sides 17B and 18B; 18C and 19C- 19D and 20D, and 20E and 17E are joined together, thereby forming a closed hollow body.

Figure 3:
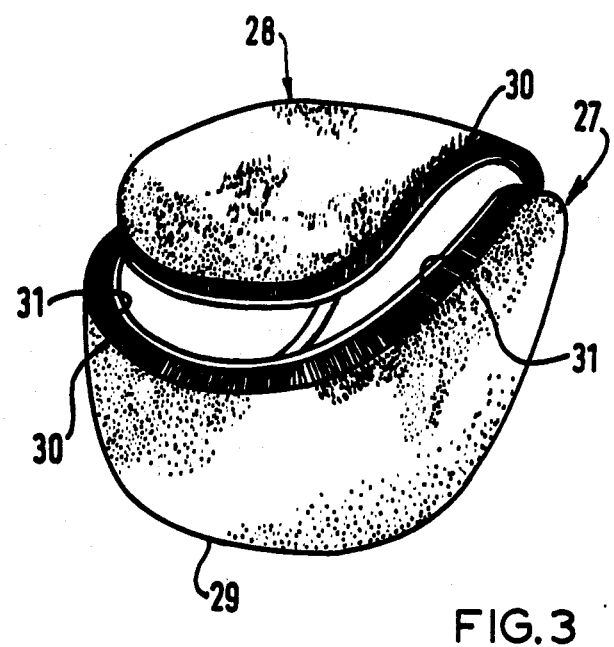
FIG. 3 is a perspective view of a hollow body or ball blank formed from two laminate blanks just prior to complete edge-joining to close it.

FIG. 3 shows a hollow body or ball blank 27 just prior to its being closed by edge-joining between two laminate blanks. The two laminate blanks 28, 29 are of substantially identical dumb-bell shape and each is a double-layered laminate having a fabric outer layer 30, an inner layer 31 of uncured elastomer. The elastomer has sufficient tack for satisfactory edge-joining between the edges of the two dumb-bell blanks when they are bent into U-form and brought together as shown.

FIG. 4 is a schematic arrangement showing the basic steps in one method of carrying out the invention. In Stage I a flat laminate of fabric and polymer layers is made. In Stage II flat dumb-bell shaped blanks are punched or cut from the laminate. Stage III shows a closed hollow body or ball blank formed by bending and edge-joining a pair of blanks from Stage II. In Stage IV the hollow body of Stage III has been placed in a spherical mold and the mold heated. The hollow body is shown conforming to the mold surface. Stage V shows the molded spherical playball after extraction from the mold.

FIG. 5 is a schematic arrangement showing the basic stages of an alternative method. Stage I shows the laminate as in FIG. 4. In Stage II the laminate is heated to soften it. In Stage III the heated laminate is pressed in a double-curvature form which also cuts out the dumb-bell shaped blanks. Thus curved, i.e. substantially U-shaped dumb-bells are obtained. Stage IV shows a pair of these shaped dumb-bells brought together and edge-joined to form a reasonably spherical hollow body. Stages V and VI correspond to Stages IV and V of FIG. 4, the reasonably spherical hollow body or ball blank of Stage IV being hot-molded to give an accurately spherical playball.

The invention is further illustrated by the following Examples in which Example 1 describes the manufacture of a tennis ball and Example 2 describes the manufacture of a playball.

EXAMPLE 1

A laminate was made from Melton wool/nylon fabric (weight 627 g/m$^2$) and a white vulcanizable natural rubber compound of 3 mm thickness.

Two substantially similar dumb-bell shapes were cut from the laminate, each weighing 28.0 grams. The dumb-bells had a major axis length of approximately 150 mm and a minor axis of approximately 40 mm. After warming to approximately 80° C., the dumb-bells were joined together by hand around their edges, each being bent into a 'U' shape. The warmed rubber at that temperature exhibited sufficient tack for the two dumb-bells to be sufficiently well adhered together. Immediately prior to final closure, 0.3 g of each of ammonium chloride and sodium nitrite were inserted in tablet form together with 0.6 g of water. The closed hollow body was then placed into the cavity of a two-piece metal mold, the closed cavity being spherical in shape and 64.77 mm in diameter. After heating for 15 minutes at 140° C., the mold was water-cooled for 10 minutes prior to the removal of the moulded tennis ball. The ball was given a conventional steam treatment to raise the wool nap.

The ball conformed to the Lawn Tennis Association specification being 64.77 mms in diameter, weighing 57.2 g, bouncing to 1397 mm and deflecting 6.60 mm when subjected to a load of 8.15 kg with a return deformation of 10.16 mm.

EXAMPLE 2

A laminate was made from a needled nylon fabric (weight 600 g/m$^2$) and an approximately 5 mm thick sheet of ethylene/vinyl acetate copolymer. (Alkathene 2805).

Two substantially similar dumb-bells approximately of the same size as in Example 1 were cut from the laminate, and after warming to about 90° C. were hand-joined together at their edges. As in Example 1 the warming to 90° C. rendered the copolymer sufficiently tacky for satisfactory edge-joining. The closed hollow body was then placed into the cavity of a two-piece metal mold, the closed cavity being spherical in shape and 64.77 mm in diameter. After heating for 10 minutes at approximately 120° C., the mold was water cooled for 10 minutes prior to the removal of the playball.

A satisfactory playball was obtained.

Having now described my invention — what I claim is:

1. A method of making a tennis ball having an inner portion of flexible polymeric material and an outer surface thereon of fiberous material without first separately forming a hollow core, said method comprising the steps of:

forming laminated blanks of a layer of said flexible polymeric material and a layer of said fiberous material, adhering together the edges of at least one of said laminated blanks to form a hollow closed body with said flexible polymeric material layer forming the inner surface of said body, placing said hollow body in a mold whose interior surface has the configuration of the desired tennis ball, and heating to conform said hollow body to said interior surface of the mold whereby a tennis ball is formed with a visible seam defining the junction between said adhered edges.

2. A method according to claim 1, in which said laminated blanks of the desired shape are obtained by cutting from a laminate formed of a layer of said fiberous material and a layer of said flexible polymeric material.

3. A method according to claim 1, in which said flexible polymeric material is an unvulcanised elastomer and the elastomer is vulcanised during the molding stage.

4. A method according to claim 11, in which said laminated blanks are joined together around their edges by means of the tacky nature of the flexible polymeric material.

5. A method according to claim 1, in which the edges of said laminated blanks are treated with a colored adhesive composition prior to their being edge-joined, and the colored composition forms a visible seam in the product.

6. A method according to claim 1, in which the laminated blanks are formed of dumb-bell shape and a pair of said dumb-bells are joined together around their edges to form the hollow body.

7. A method according to claim 1, in which the tennis ball is pressurized.

8. A method according to claim 1, in which said laminate is formed of an outer fabric layer, an intermediate elastomeric layer and an inner layer of gas-impermeable polymeric material.

9. A method according to claim 1, wherein said fiberous material is selected from the group consisting of woven fabics, non-woven fabrics and flocked fibers.

10. A method according to claim 1, wherein said flexible polymeric material is selected from the group consisting of initially unvulcanized elastomers and thermoplastic materials.

11. A method according to claim 1, wherein said step of forming laminated blanks of a layer of said flexible polymeric material and a layer of said fiberous material comprises forming a piece of fabric to the desired blank shape and laminating a layer of polymeric material thereto.

12. A method according to claim 1, in which a vacuum is applied to the interior of the mold during the moulding to the desired form of tennis ball.

13. A method according to claim 12, in which said hollow body is heated in the mold before application of the vacuum.

14. A method according to claim 1, in which a pre-shaping operation is employed between the formation of said laminate and the construction of the hollow body.

15. A method according to claim 14, in which said laminated blanks are shaped to 3-dimensional form after being cut from the laminated sheet material and before being edge-joined.

16. A method of making a tennis ball having an inner portion of flexible polymeric material and an outer surface thereon of fiberous material without first separately forming a hollow core, said method comprising the steps of:

adhering a layer of fiberous material to one surface of a sheet of flexible polymeric material to form a laminated sheet;

forming a plurality of blanks from said laminated sheet, said blanks being shaped so that at least one of said blanks can be formed into a ball;

adhering together the edges of said at least one blank to form a hollow closed body with said fiberous material forming the outer surface thereof;

placing said hollow body in a mold whose interior surface has the configuration of the desired tennis ball, and heating to conform said hollow body to said interior surface of the mold whereby a tennis ball is formed with a visible seam defining the junction between said adhered edges.

17. A method of making a tennis ball having an inner portion of flexible polymeric material and an outer surface thereon of fiberous material without first separately forming a hollow core, said method comprising the steps of:

forming laminated blanks of a layer of said flexible polymeric material and a layer of said fiberous material, adhering together the edges of at least two of said laminated blanks to form a hollow closed body with said flexible polymeric material layer forming the inner surface of said body, placing said hollow body in a mold whose interior surface has the configuration of the desired tennis ball, and heating to conform said hollow body to said interior surface of the mold whereby a tennis ball is formed with a visible seam defining the junction between said adhered edges.

18. A method of making a tennis ball having an inner portion of flexible polymeric material and an outer surface thereon of fiberous material selected from the group consisting of woven fabrics, non-woven fabrics and flocked fibers, without first separately forming a hollow core, said method comprising the steps of:

forming laminated blanks of a layer of said flexible polymeric material in the form of an unvulcanized elastomer and a layer of said fiberous material in a dumb-bell shape by forming a piece of fabric in a dumb-bell shape and laminating a layer of said polymeric material thereto, adhering together the edges of a pair of said dumb-bell shape laminated blanks by means of the tacky nature of the unvulcanized flexible polymeric material to form a hollow closed body with said flexible polymeric material layer forming the inner surface of said body, placing said hollow body in a mold whose interior surface has the configuration of the desired tennis ball and applying a vacuum to the interior of the mold, and heating to conform said hollow body to said interior surface of the mold whereby said elastomer is vulcanized during the molding stage and a tennis ball is formed with a visible seam defining the junction between said adhered edges.

* * * * *